United States Patent
Lee et al.

(10) Patent No.: US 9,191,126 B2
(45) Date of Patent: Nov. 17, 2015

(54) BODY CHANNEL COMMUNICATION METHOD AND DEVICE USING A TRANSMISSION MODE ACCORDING TO INTEREFENCE ESTIMATE

(71) Applicant: NATIONAL CHIAO TUNG UNIVERSITY, Hsinchu (TW)

(72) Inventors: Chen-Yi Lee, Hsinchu (TW); Wei-Hao Sung, Kaohsiung (TW); Shu-Ping Lin, Taipei (TW)

(73) Assignee: NATIONAL CHAIO TUNG UNIVERSITY, Hsinchu (TW)

( * ) Notice: Subject to any disclaimer, the term of this patent is extended or adjusted under 35 U.S.C. 154(b) by 232 days.

(21) Appl. No.: 13/853,065

(22) Filed: Mar. 29, 2013

(65) Prior Publication Data

US 2014/0162561 A1 Jun. 12, 2014

(30) Foreign Application Priority Data

Dec. 12, 2012 (TW) .............................. 101146922 A (51) Int. Cl.
*H04B 13/00* (2006.01)
*H04W 28/04* (2009.01)

(52) U.S. Cl.
CPC .............. *H04B 13/005* (2013.01); *H04W 28/04* (2013.01)

(58) Field of Classification Search
None
See application file for complete search history.

(56) References Cited

U.S. PATENT DOCUMENTS

| | | | |
|---|---|---|---|
| 7,664,476 B2 | 2/2010 | Yanagida | |
| 8,131,334 B2 | 3/2012 | Lu et al. | |
| 8,165,236 B2 | 4/2012 | Hyoung et al. | |
| 2009/0103643 A1* | 4/2009 | Hyoung et al. | 375/260 |
| 2010/0234756 A1* | 9/2010 | Hyoung et al. | 600/547 |
| 2010/0315206 A1* | 12/2010 | Schenk et al. | 340/286.01 |
| 2010/0316158 A1* | 12/2010 | Arne | 375/285 |
| 2010/0322290 A1* | 12/2010 | Kang et al. | 375/146 |
| 2011/0200150 A1* | 8/2011 | Fazzi et al. | 375/343 |

FOREIGN PATENT DOCUMENTS

CN 101904118 A 12/2010

OTHER PUBLICATIONS

S.-J. Song, N. Cho, and H.-J. Yoo, "A 0.2-mW 2-Mb/s Digital Transceiver Based on Wideband Signaling for Human Body Communications," IEEE J. Solid-State Circuits, vol. 42, No. 9, pp. 2021-2033, Sep. 7.

A. Fazzi, S. Ouzounov, and J. Homberq, "A 2.75mW Wideband Correlation-Based Transceiver for Body-Coupled Communication," in IEEE Int. Solid-State Circuits Conf. Dig. Tech. Papers (ISSCC), pp. 204-205.

(Continued)

*Primary Examiner* — Alejandro Rivero
(74) *Attorney, Agent, or Firm* — CKC & Partners Co., Ltd.

(57) ABSTRACT

A body channel communication method is disclosed including the following steps. Whether or not a body channel is established is detected. When that a body channel is established is detected, a check packet is received from an electrical device, which is at another end of the body channel, through the body channel. A current interference power of the body channel is estimated according to the received check packet. A current transmission mode for the body channel is obtained according to the current interference power. Data is transmitted through the body channel, which is set to the current transmission mode. Further, a body channel communication device is also disclosed.

6 Claims, 4 Drawing Sheets

(56) References Cited

OTHER PUBLICATIONS

N. Cho, L. Yan, J. Bae, and H.-J. Yoo, "A 60 kb/s-10 Mb/s Adaptive Frequency Hopping Transceiver for Interference-Resilient Body Channel Communication," IEEE J. Solid-State Circuits, vol. 44, No. 3, Mar. 2009.

Tsan-Wen Chen et al., "A 0.67mW 14.55Mbps OFDM-Based Sensor Node Transmitter for Body Channel Communications." IEEE Asian Solid-State Circuits Conference (A-SSCC), Nov. 14-16, 2011/ Jeju, Korea, pp. 189-192.

Ping-Yuan Tsai et al., "A QPSK/16-QAM OFDM-based 29.1 Mbps LINC Transmitter for Body Channel Communication." IEEE Asian Solid-State Circuits Conference (ASSCC), Nov. 2012.

* cited by examiner

BODY CHANNEL COMMUNICATION METHOD AND DEVICE USING A TRANSMISSION MODE ACCORDING TO INTEREFENCE ESTIMATE

RELATED APPLICATIONS

This application claims priority to Taiwan Application Serial Number 101146922, filed Dec. 12, 2012, which is herein incorporated by reference.

BACKGROUND

1. Technical Field

The present invention relates to a body channel communication method and device.

2. Description of Related Art

Body channel communication (BCC) is a technology applying the human body as the signal transmission medium for data transmission. In particular, in that the human channel features good conductivity, signals transmitted through the human skin is subject to lower path loss. Compared with the wireless channel transmission, more power can be utilized for modulation during transmission through the body channel. Accordingly, data can be transmitted through the low frequency domain utilizing the BCC technology, which can omit the high-frequency radio frequency (RF) circuit and is suitable for low power systems. In addition, the interference caused by other high-frequency RF products can also be avoided.

At present, the BCC technology is apt to be interfered by external noises coupled to the various body channels, which limits data transmission rate. Hence, BCC technology is insufficient to provide boarder bandwidth for transmitting higher video/audio data stream. In some researches of the BCC technology, high-level modulation is utilized to provide high bandwidth, which, however, consumes large amount of energy and is not suitable for mobile devices.

Therefore, there is a need to provide high data transmission rate utilizing the BCC technology with less power consumption.

SUMMARY

According to one embodiment of this invention, a body channel communication method is disclosed to utilize a check packet to set a transmission mode for an established body channel. The body channel communication method includes the following steps:

(a) Whether or not a body channel is established is detected.

(b) When it is detected that a body channel is established, a check packet is received from an electrical device, which is at another end of the body channel, through the body channel.

(c) A current interference power of the body channel is estimated according to the received check packet.

(d) A current transmission mode for the body channel is obtained according to the current interference power.

(e) Data is transmitted through the body channel, which is set to the current transmission mode.

According to another embodiment of this invention, a body channel communication device is disclosed. The body channel communication device includes a body channel transmission unit and a processing unit, which are electrically connected to each other. The processing unit includes a detecting module, a receiving module, an estimating module and a setting module. The detecting module detects if a body channel is established utilizing the body channel transmission unit. When the detecting module detects that the body channel is established, the receiving module receives a check packet from an electrical device, which is at another end of the body channel, through the body channel. The estimating module estimates a current interference power of the body channel according to the received check packet. The setting module obtains a current transmission mode for the body channel according to the current interference power, and transmits data through the body channel, which is set to the current transmission mode.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
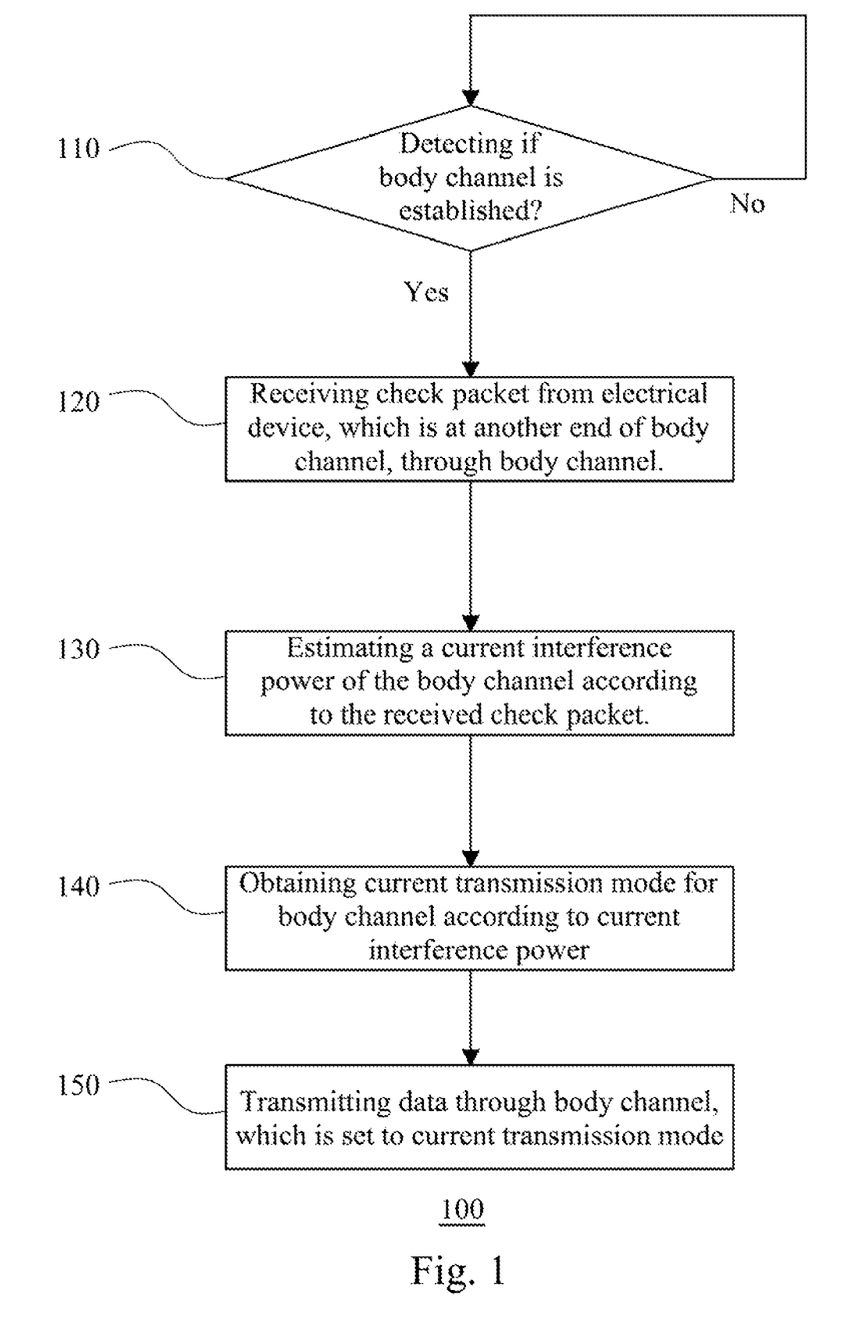
FIG. 1 is a flow diagram that illustrates a body channel communication method according to one embodiment of this invention.

Referring to FIG. 1, a flow diagram will be described that illustrates a body channel communication method according to one embodiment of this invention. In the body channel communication method, a check packet is utilized to set a transmission mode for an established body channel. The body channel communication method may take the form of a computer program product stored on a non-transitory computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The body channel communication method 100 includes the following steps:

At step 110, detect if a body channel is established.

At step 120, when it is detected that a body channel is established, a check packet is received from an electrical device, which is at another end of the body channel, through the body channel. In other words, when it is detected that a body channel is established, the electrical device, which is at another end of the body channel, may transmit a specified check packet for reception at step 120.

At step 130, a current interference power of the body channel is estimated according to the received check packet.

At step 140, a current transmission mode for the body channel is obtained according to the current interference power.

Subsequently, at step 150, data is transmitted through the body channel, which is set to the current transmission mode. Therefore, the body channel can be set to a suitable mode, which is adaptive for the current interference power of the body channel and provides high transmission rate. In addition, in some embodiments of the body channel communication method 100, step 120 to step 150 may be performed continually to dynamically adjust the transmission mode of the body channel.

Figure 2:
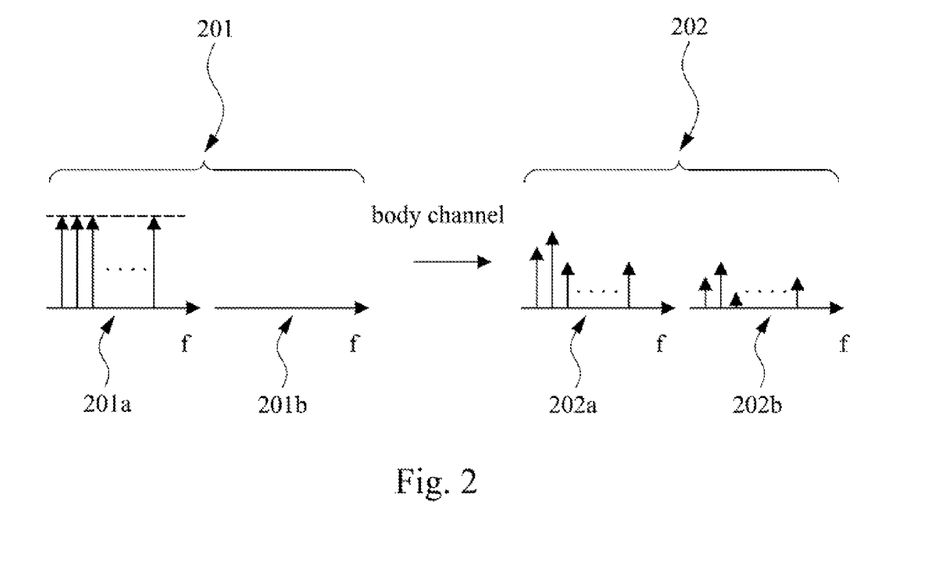
FIG. 2 is an example of the check packet.

In some embodiment of this invention, the check packet may include at least one check symbol. Accordingly, in some embodiments of step 130, the current interference power of the body channel may be calculated according to the at least one check symbol and at least one preset symbol corresponding to the check packet. For example, please refer to FIG. 2, which is an example of the check packet. The electrical device, which is at another end of the body channel, may embed the preset symbol in the check packet for transmission. The preset symbol of the check packet to be transmitted 201 may include at least one preset uniform symbol 201a and at least one preset null symbol 201b in at least one frequency domain. Hence, after transmitted through the body channel, the received check packet 202 may include at least one uniform symbol for check 202a and at least one null symbol for check 202b. Subsequently, the current interference power of the body channel can be calculated utilizing the formula as follows:

$$I_k = \lfloor S'_{N,k}/(S'_{U,k} - S'_{N,k}) \rfloor \times S_{U,k}$$

wherein $I_k$ is the current interference power of a sub-carrier k of the check packet, $S'_{N,k}$ is the null symbol for check in the sub-carrier k of the received check packet, $S'_{U,k}$ is the uniform symbol for check in the sub-carrier k of the received check packet, and $S_{U,k}$ is the preset uniform symbol in the sub-carrier k of the preset symbol. Hence, in some embodiments of step 140, the current interference power in each frequency domain (or ailed sub-carrier) of the body channel can be estimated, and adaptively set each sub-carrier k to different transmission modes. When the current interference power of a sub-carrier k is more than a threshold, data may not be transmitted through such sub-carrier k to reduce transmission error rate. In another embodiment of step 140, sum of current interference power of frequency domains (sub-carriers) may be further estimated for setting the current transmission mode. In other embodiments, other types of symbols may be taken as the check symbol for estimating the current interference power, which should not be limited in this disclosure.

In some embodiments of step 140, an error correction code (ECC) algorithm for the current transmission mode may be determined according to the current interference power. For example, when the estimated current interference power is high, the ECC algorithm with high correction ability or more redundant codes may be utilized for data transmission, which can reduce transmission error rate; when the estimated current interference power is low, the ECC algorithm with low correction ability or fewer redundant codes may be utilized for data transmission, which can increase the transmission rate.

In some other embodiments of step 140, a modulation method for the current transmission mode may be determined according to the current interference power. For example, the modulation method for the current transmission mode may be selected from Quadrature phase-shift keying (QPSK), Quadrature Amplitude Modulation (QAM), 16-QAM, 64-QAM, 256-QAM or any other modulation method.

Figure 3:
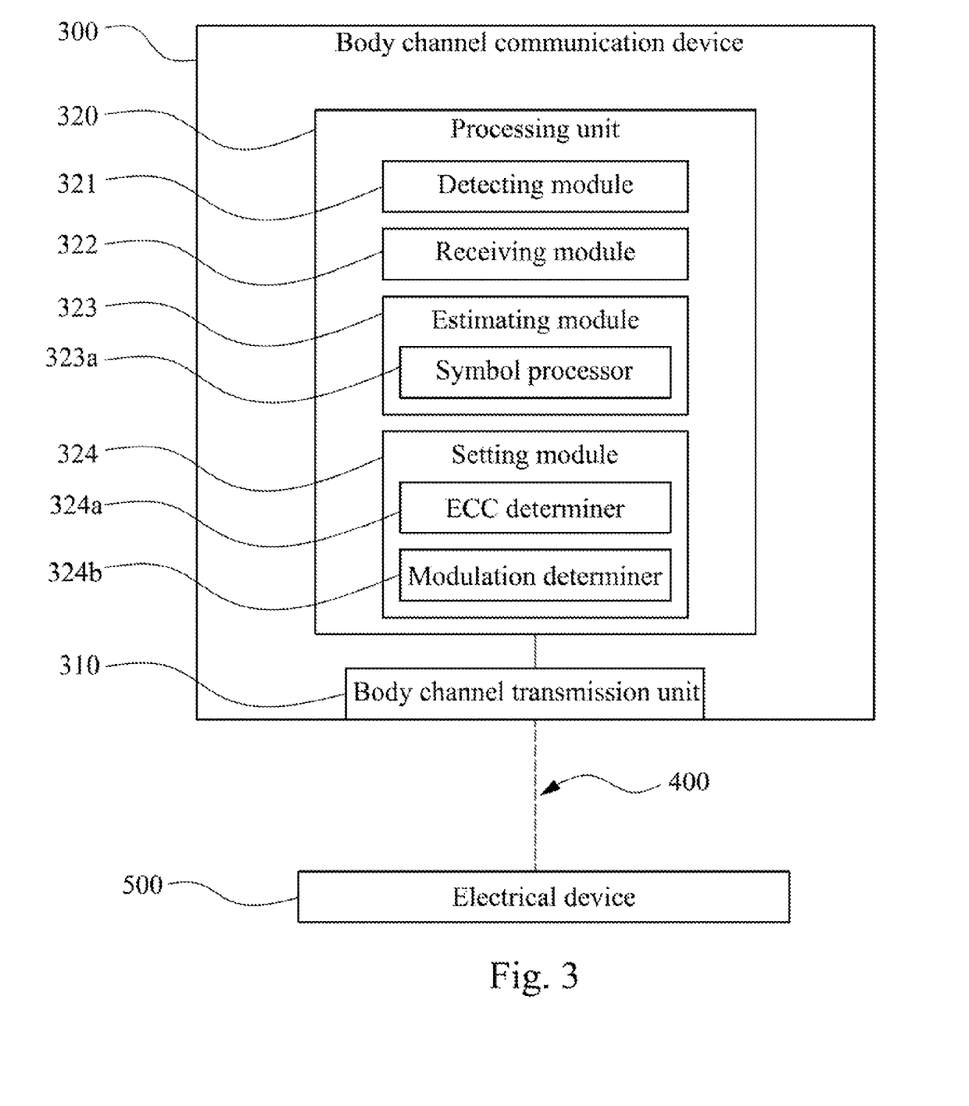
FIG. 3 illustrates a block diagram of a body channel communication device according to an embodiment of this invention.

FIG. 3 illustrates a block diagram of a body channel communication device according to an embodiment of this invention. The body channel communication device 300 includes a body channel transmission unit 310 and a processing unit 320, which are electrically connected to each other. The body channel transmission unit 310 may be an electrode device, an electromagnetic (EM) wave tranducer, a radio frequency (RF) unit or any other hardware device for body channel communication.

The processing unit 320 includes a detecting module 321 a receiving module 322, an estimating module 323 and a setting module 324. The detecting module 321 detects if a body channel is established utilizing the body channel transmission unit 310.

When the detecting module 321 detects that a body channel 400 is established, the receiving module 322 receives a check packet from an electrical device 500, which is at another end of the body channel 400, through the body channel 400. In other words, when it is detected that the body channel 400 is established, the electrical device 500, which is at another end of the body channel 400, may transmit a specified check packet to the body channel communication device 300.

Figure 4:
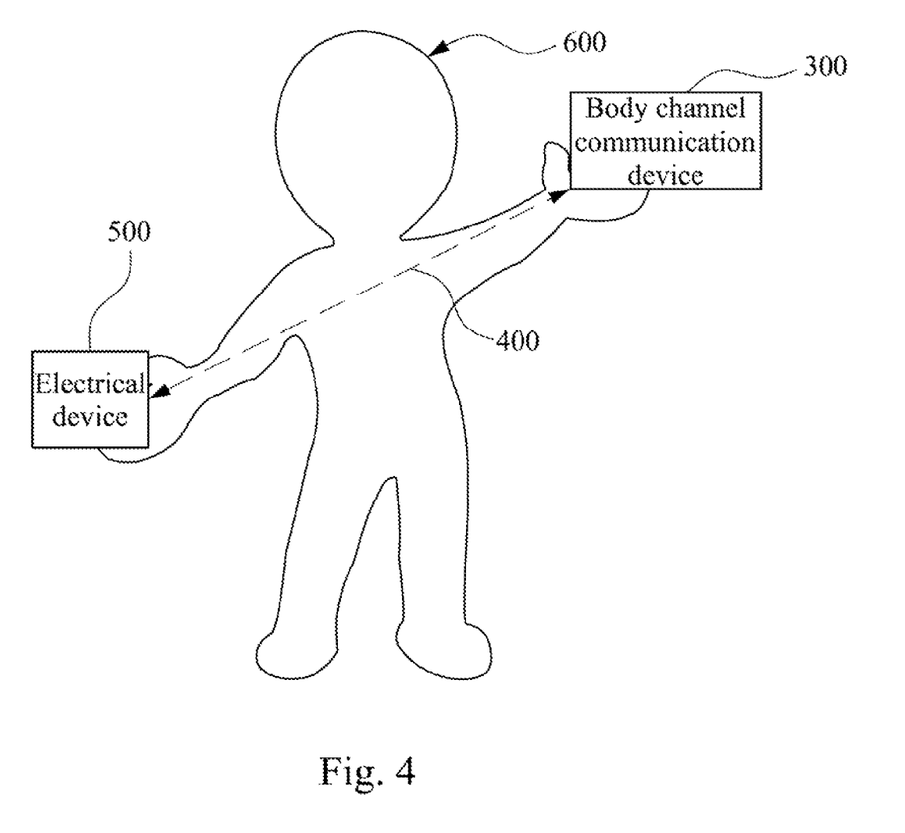
FIG. 4 illustrates a scenario to use the body channel communication device 300 of this invention.

Referring to FIG. 4, which illustrates a scenario to use the body channel communication device 300 of this invention. In this embodiment, when a user 600 of the body channel communication device 300 touches the electrical device 500 or is in the sensing area of the electrical device 500, the detecting module 321 may detect and establish a body channel 400 between the body channel communication device 300 and the electrical device 500 through the user 600. Subsequently, the electrical device 500 may transmit a specified check packet to the body channel communication device 300 through the body channel 400, which is provided by the user 600.

The estimating module 323 estimates a current interference power of the body channel 400 according to the received check packet. Hence, the setting module 324 obtains a current transmission mode for the body channel 400 according to the current interference power, and transmits data through the body channel 400, which is set to the current transmission mode. Therefore, the body channel 400 can be set to a suitable mode, which is adaptive for the current interference power of the body channel 400 and provides high transmission rate. In addition, in some embodiments of this invention, the body channel communication device 300 may keep receiving the check packet for dynamically adjusting the transmission mode of the body channel.

In some embodiments of this invention, the check packet may include at least one check symbol. Hence, a symbol processor 323a of the estimating module 323 may calculate the current interference power of the body channel 400 according to the at least one check symbol and at least one preset symbol corresponding to the check packet. For example, the electrical device 500 may transmit a specified check packet, which includes a uniform symbol and a null symbol. Hence, the symbol processor 323a may calculate difference between the received check symbol and the at least one check symbol corresponding to the check packet for example, a uniform symbol and a null symbol), such that the current interference power of the body channel 400 can be calculated according to the fore-mentioned difference for the setting module 324 to configure the current transmission mode.

In some embodiments of this invention, different ECC algorithms may be set for data transmission according to the current interference power of the body channel 400. Hence, an ECC determiner 324a of the setting module 324 may determine an ECC algorithm for the current transmission mode according to the current interference power, such that data is transmitted utilizing the determined ECC algorithm through the body channel 400. For example, when the estimated current interference power is high, the ECC determiner 324a may select the ECC algorithm with high correction ability or more redundant codes for data transmission, which can reduce transmission error rate; when the estimated current interference power is low, the ECC determiner 324a may select the ECC algorithm with low correction ability or fewer redundant codes for data transmission, which can increase the transmission rate.

In some other embodiments of this invention, different modulation methods may be set for data transmission according to the current interference power of the body channel 400. Hence, a modulation determiner 324b of the setting module 324 may determine a modulation method for the current transmission mode according to the current interference power, such that data is transmitted to the electrical device 500 utilizing the modulation method through the body channel 400. For example, the modulation determiner 324b may select the modulation method for the current transmission mode from QPSK, QAM, 16-QAM, 64-QAM, 256-QAM or any other modulation method, such that the current interference power of the body channel 400 can be adaptive during data transmission.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A body channel communication method comprising the steps of:
    (a) detecting if a body channel is established;
    (b) when that a body channel is established is detected, receiving a check packet from an electrical device, which is at another end of the body channel, through the body channel;
    (c) estimating a current interference power of the body channel according to the received check packet;
    (d) obtaining a current transmission mode for the body channel according to the current interference power; and
    (e) transmitting data through the body channel, which is set to the current transmission mode;
    wherein the check packet comprises at least one check symbol, and step (c) comprises the step of:
    calculating the current interference power of the body channel according to the at least one check symbol and at least one preset symbol corresponding to the check packet;
    wherein the at least one preset symbol comprises at least one preset uniform symbol and at least one preset null symbol, and the at least one check symbol comprises at least one uniform symbol for check and at least one null symbol for check;
    wherein the step of calculating the current interference power of the body channel according to the at least one check symbol and the at least one preset symbol is implemented as follows:

$$I_k = \lfloor S'_{N,k}/(S'_{U,K} - S'_{N,k}) \rfloor \times S_{U,k}$$

wherein $I_k$ is the current interference power of a sub-carrier k of the check packet, $S'_{N,k}$ is the null symbol for check in the sub-carrier k of the received check packet, $S'_{U,K}$ is the uniform symbol for check in the sub-carrier k of the received check packet, and $S_{U,k}$ is the preset uniform symbol in the sub-carrier k of the preset symbol.

2. The body channel communication method of claim 1, wherein step (d) comprises the step of:
    determining an error correction code (ECC) algorithm for the current transmission mode according to the current interference power.

3. The body channel communication method of claim 1, wherein step (d) comprises the step of:
    determining a modulation method for the current transmission mode according to the current interference power.

4. A body channel communication device comprising:
    a body channel transmission unit; and
    a processing unit, electrically connected to the body channel transmission unit, the processing unit comprising:
    a detecting module which detects if a body channel is established utilizing the body channel transmission unit;
    a receiving module which receives a check packet from an electrical device, which is at another end of the body channel, through the body channel when the detecting module detects that the body channel is established;
    an estimating module which estimates a current interference power of the body channel according to the received check packet; and
    a setting module which obtains a current transmission mode for the body channel according to the current interference power, and transmits data through the body channel, which is set to the current transmission mode;
    wherein the check packet comprises at least one check symbol, and the estimating module comprises:
    a symbol processor which calculates the current interference power of the body channel according to the at least one check symbol and at least one preset symbol corresponding to the check packet;
    wherein the at least one preset symbol comprises at least one preset uniform symbol and at least one preset null symbol, and the at least one check symbol comprises at least one uniform symbol for check and at least one null symbol for check;
    wherein the current interference power is calculated as follows:

$$I_K = \lfloor S'_{N,k}/(S'_{U,k} - S'_{N,k}) \rfloor \times S_{U,k}$$

wherein $I_k$ is the current interference power of a sub-carrier k of the check packet, $S'_{N,k}$ is the null symbol for check in the sub-carrier k of the received check packet, $S'_{U,k}$ is the uniform symbol for check in the sub-carrier k of the received check packet, and $S_{U,k}$ is the preset uniform symbol in the sub-carrier k of the preset symbol.

5. The body channel communication device of claim 4, wherein the setting module comprises:

an error correction code (ECC) determiner which determines an ECC algorithm for the current transmission mode according to the current interference power, such that data is transmitted utilizing the ECC algorithm through the body channel.

6. The body channel communication device of claim 4, wherein the setting module comprises:
a modulation determiner which determines a modulation method for the current transmission mode according to the current interference power, such that data is transmitted utilizing the modulation method through the body channel.

\* \* \* \* \*

UNITED STATES PATENT AND TRADEMARK OFFICE
CERTIFICATE OF CORRECTION

PATENT NO. : 9,191,126 B2
APPLICATION NO. : 13/853065
DATED : November 17, 2015
INVENTOR(S) : Chen-Yi Lee, Wei-Hao Sung and Shu-Ping Lin Page 1 of 1

It is certified that error appears in the above-identified patent and that said Letters Patent is hereby corrected as shown below:

Title page, Item (73) Assignee: Should read as "National Chiao Tung University," rather than "National Chaio Tung University".

Signed and Sealed this
Eighth Day of March, 2016

Michelle K. Lee
*Director of the United States Patent and Trademark Office*